June 12, 1962 TATSUNOSUKE MASUDA 3,038,993
APERTURE SYSTEM FOR ELECTRON OPTICAL INSTRUMENT
Filed May 14, 1959

INVENTOR.
TATSUNOSUKE MASUDA
BY
ATTORNEYS

United States Patent Office 3,038,993
Patented June 12, 1962

3,038,993
APERTURE SYSTEM FOR ELECTRON
OPTICAL INSTRUMENT
Tatsunosuke Masuda, 546, 4-chome, Minami-Shinagawa,
Shinagawa-ku, Tokyo, Japan
Filed May 14, 1959, Ser. No. 813,180
Claims priority, application Japan May 21, 1958
5 Claims. (Cl. 250—49.5)

This invention relates to improvements in an electron optical instrument and, more particularly, relates to an improved apparatus and process for removing contaminating materials from the apertures, such as the objective aperture, of an electron microscope.

An electron microscope is a well-known research instrument and in either the electro-magnetic type electron microscope or the electro-static type electron microscope, it comprises an electron source, an illuminating system, an objective lens, a projection lens, and a photographic camera, all of which are arranged in alignment and assembled within a casing. A vacuum system is connected for maintaining vacuum within the casing. It is conventional practice for most uses of electron microscopes, to place an objective aperture of small size, usually 20 microns-100 microns diameter, at the center of the objective lens or near the back focal plane of the objective lens. The objective aperture is provided for minimizing spherical and chromatic aberration of the microscope. It is also conventional practice to place the specimen, to be examined by the electron microscope, below and in axial alignment with said objective aperture so that the electron beam passing through the aperture will impinge upon said specimen.

Since the vacuum in the electron microscope unit is imperfect, the electron beam ionizes residual gases in the unit and, as a result, contaminating substances are deposited on surfaces nearby to the electron beam, particularly, those in the path of the electron beam, such as on the edge of the objective aperture. The contaminating films are charged electrostatically by the electron beam and create an electrostatic field around the objective aperture which exerts forces on the passing electrons. This causes astigmatism and/or movement of the image and materially impairs the quality of the image. While this problem has been recognized heretofore, the prior art considered it necessary to make the diaphragm having the objective aperture therethrough readily exchangeable to permit periodic cleaning of the diaphragm. Cleaning of the diaphragm is tedious work and requires skilled personnel and must often be done after the diaphragm has been in use for only about an hour.

The same problem arises in the other apertures utilized in electron microscope or electron diffraction instruments, for example, in the aperture in the illuminating system of the electron microscope or the electron diffraction instrument. Heretofore, it has here also always been considered necessary to manually clean these apertures in order to remove the contaminating materials therefrom. This obviously is undesirable for the same reasons as those discussed above.

Accordingly, it is an object of this invention to provide an improved construction for an electronic optical device, such as an electron microscope or an electron diffraction instrument which includes means for removing contaminating materials from an aperture therein in a relatively short time and without removing the aperture from the instrument.

It is a further object of this invention to provide an improved electronic optical device, as aforesaid, in which the contaminating materials are removed by heating same to a high temperature, as about 1500 degrees C. to evaporate same, the evaporation being done while the aperture is within the casing of the device and is acted upon by the vacuum therein.

It is a further object of this invention to provide an improved electronic optical device, as aforesaid, in which the aperture is provided in a sheet or diaphragm of high melting point material, in some cases electrically conductive with a high resistance, such as molybdenum, and means is provided to move the sheet or diaphragm out of axial alignment with the lenses of the device so that the vaporized, contaminating materials are not deposited on the parts of the lenses.

It is a further object of this invention to provide an improved electron microscope or electron diffraction instrument, as aforesaid, in which the structure for moving the aperture and the means for heating same is relatively inexpensive, comparatively easy to incorporate in electron microscopes or diffraction instruments, either as an original part thereof or as an addition thereto, which is reliable in operation and which requires relatively little maintenance.

It is a further object of this invention to provide an improved process for removing contaminating materials from an aperture, such as the objective aperture of electron microscopes, or the aperture of illuminating systems of electron diffraction instruments.

Other objects and advantages of the invention will become apparent to those acquainted with the equipment of this type upon reading the following description and inspecting the accompanying drawings, in which.

Figure 1:
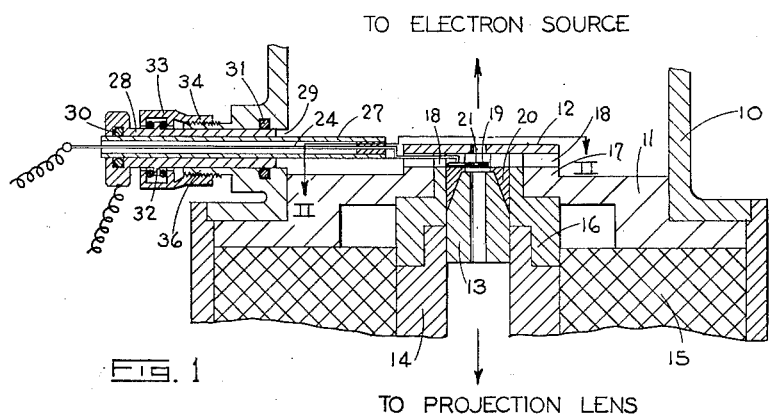
FIGURE 1 is a central, sectional view through the objective lens portion of an otherwise conventional electron microscope and showing the structure of the invention.

In general, the invention provides a thin sheet or diaphragm formed of high melting point material, such as molybdenum, said sheet having an opening therethrough which forms an aperture, such as the objective aperture, of an electronic optical device, such as an electron microscope or an electron diffraction instrument. The sheet is associated with suitable means so that the sheet may be heated to a high temperature, such as 1500 degrees C. to evaporate the contaminating materials which accumulate on the sheet. Means is also provided for moving the sheet away from the axis of the electronic device so that when the evaporation of the contaminating materials occur, the vaporized materials will not be able to condense on portions of the electronic optical device adjacent the path of the electron beam, such as the pole pieces of the objective lens thereof.

Since the problem of removing contaminating materials is particularly acute for the objective aperture of an electron microscope, the description of the invention will proceed primarily with reference thereto. However, it will be understood, that the principles of the invention can be applied as well to other apertures in electron microscope or electron diffraction instruments and the scope of the invention should be construed accordingly.

*Detailed Description*

The electron microscope includes a generally cylindrical casing 10 having an annular, transversely extending support plate 11 secured thereto. An upper pole piece 12 of the objective lens is supported upon the plate 11 and it has a central opening therethrough which is coaxially aligned with the beam of electrons from the electron source. A lower, generally cylindrical, pole piece 13 is provided and is supported upon an inner tubular member 14. The upper and lower pole pieces 12 and 13 are spaced a predetermined axial distance from each other by a sleeve 16 of suitable nonmagnetic material, such as brass. The axial spacing of the adjacent surfaces of the upper and lower pole pieces from each other is usually on the order of about 0.3–0.5 centimeter while the diameter of the central openings in the upper and lower pole pieces is of a generally similar, although not necessarily the same, value. A magnetic coil 15 is wound about tubular member 14 and said member 14, plate 11 and pole pieces 12 and 13 are made of a highly permeable material, such as iron. An annular sleeve 20 which is made of nonmagnetic material, such as brass is provided between the pole pieces 12 and 13.

The annular plate 11 has a upstanding boss 17 thereon on which the upper pole piece 12 is supported. The boss 17 and the sleeve 20 have a plurality of, here four, equally spaced, radially extending slots 18 therein. While only one of the slots is required to insert the objective aperture, as hereinafter described, four slots are provided in order to maintain the symmetry of the magnetic lens and thus avoid unbalanced magnetic forces acting upon the electron beam.

A thin sheet or diaphragm 19 is placed between the upper and lower pole pieces 12 and 13. The diaphragm has an opening 21 of small diameter, such as from about 20 microns to 100 microns, therethrough which is coaxial with the openings in the upper and lower pole pieces 12 and 13 and through which the electron beam passes. The sheet or diaphragm is in one embodiment formed of a high melting point, electrically conductive, material for which purpose a molybdenum sheet is preferred. However, sheets of other materials, such as iridium and tungsten also appear to be satisfactory. Platinum, due to its lower melting point, is not as satisfactory, but may be used under certain circumstances, such as where the contaminating materials are removed by a relatively low temperature evaporation operation.

The sheet or diaphragm 19 is generally U-shaped and has a pair of legs 22 and 23 which are connected, respectively, to electrical conductors 24 and 26. The opening 21 is provided through the web connecting legs 22 and 23. The conductors 24 and 26 extend through one of the slots 18 in the annular plate 11 and are connected in a suitable fashion to a source of electrical potential. Here, conductor 24 extends through a central opening in a cylindrical casing 27 while conductor 26 is connected to said casing so that the casing serves as a return line for the electrical current. The conductor 24 and the casing 27 are connected in any suitable fashion to a source of potential whereby upon electrically energizing the said conductors, the diaphragm or sheet 19 will be heated to a high temperature, such as about 1500 degrees C.

The casing 27 extends through and is secured to a sleeve 28. The sleeve 28 extends through a suitable opening 29 in the casing 10. Sealing means, such as an O-ring 31 is provided for the purpose of sealing the atmosphere from the interior of the casing 10 in order to maintain the vacuum therewithin. Corresponding sealing means 30 is provided between the casing 27 and the sleeve 28 for the same purpose. The sleeve 28 has a radially outwardly extending flange 32 thereon adjacent the outer end thereof. The flange is engaged by a rotatable hand knob 33 so that the sleeve 28, casing 27, and thereby the diaphragm or sheet 19 can be moved inwardly and outwardly of the casing 10 in response to movement of the hand knob 33 toward or away from the casing. The hand knob 33 has an internally threaded extension 34 which threadedly engages an externally threaded projection 36 on the casing 10. Also, the diaphragm or sheet 19 is fixed on the casing 27 eccentrically with respect to the axis of the casing 27. By rotating the knob 33 and holding the sleeve 28 against rotation, the diaphragm is caused to move in a direction parallel with the axis of the sleeve 27. By holding the knob 33 against rotation and rotating the sleeve 28 through a small arc, the eccentric mounting of diaphragm 19 will cause a movement of said opening 21 transversely to the axis of the sleeve 28. Thus, by manipulating both the knob 33 and the sleeve 28, the position of the opening 21 can be adjusted as desired.

Before heating the diaphragm or sheet 19 to evaporate the contaminating materials, the casing 27 is pulled toward the sleeve 28 so that the diaphragm or sheet 19 is out from between the lens pole pieces 12 and 13. This will prevent depositing the contaminating materials on the part of the lens pole piece.

*Operation*

The operation of the electron microscope will proceed in accordance with conventional practice and, therefore, detailed description thereof is believed to be unnecessary. As the operation of the microscope proceeds, contaminating materials are deposited upon the sheet or diaphragm 19, particularly around the central opening 21 and such, if not removed, will, after use of the microscope for a period of an hour so so, begin to detrimentally affect the quality of the image produced thereby.

When it is desired to remove the contaminating materials from the diaphragm, the casing 27 is pulled radially outwardly by sliding it in the sleeve 28 so that the diaphragm 19 is out from between the pole pieces but still within the evacuated casing. While this step is preferred, it is not absolutely essential for the purposes of the invention since there may be situations where evaporation of the contaminating materials while the diaphragm or sheet 19 is between the pole pieces, will not seriously affect the subsequent operation of the instrument and, therefore, this step of moving the sheet or diaphragm may, under some circumstances, be unnecessary.

The electrical supply wires are then connected to a suitable electrical source and this will effect heating of the plate or diaphragm 19 due to the relatively high electrical resistance thereof. The plate is heated to a high temperature which, under most circumstances, will be about 1500 degrees C. and such will cause evaporation or sublimation of the contaminating materials on the diaphragm or sheet 19 so that the said sheet is completely cleaned. Since the sheet or diaphragm is formed of a high melting point material, such as molybdenum which has a melting point in excess of 2600 degrees C., such will not detrimentally effect the quality of the sheet for use as an objective aperture since the dimension of the central opening 21 therein will remain unchanged. Obviously, however, if a lower melting point material, such as platinum, were used, heating the sheet to such a high temperature would detrimentally effect the dimension of the objective aperture provided thereby and, consequently, such a material could not be used unless it were possible to vaporize the contaminating materials at a lower tempera- It is particularly pointed out that at all times, either in the preferred or alternate form of vaporizing the contaminating materials, the sheet or diaphragm remains within the casing of the electron microscopes and is, therefore, within the vacuum in the casing. Thus, it is not necessary to break the vacuum in the electron microscope and, since the vaporizing operation can take place quite rapidly, it is apparent that no substantial delays in the use of the microscope are involved following the procedure of the invention.

Figure 3:
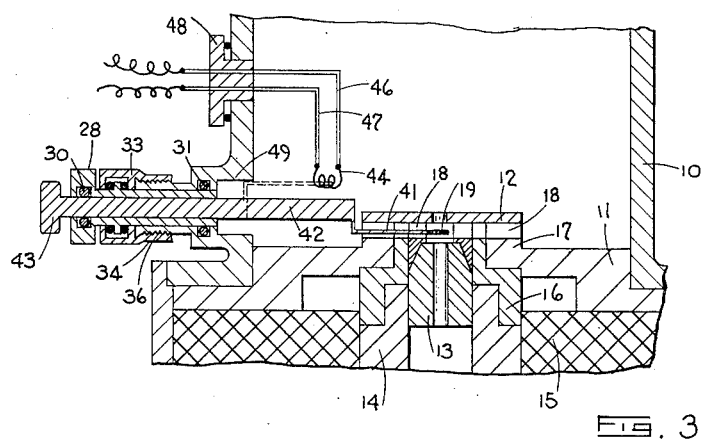
FIGURE 3 is a view generally similar to FIGURE 1 and showing a modification.

Alternatively, under some circumstances, the diaphragm 19, rather than being heated by electrical resistance heating, as above described, can be heated by other means, such as by applying a suitable heat source directly to the conductors 24 and 26 so that same will conduct heat to the diaphragm 19, or such as by applying heat to the diaphragm 19 in the manner shown in FIGURE 3.

Figure 2:
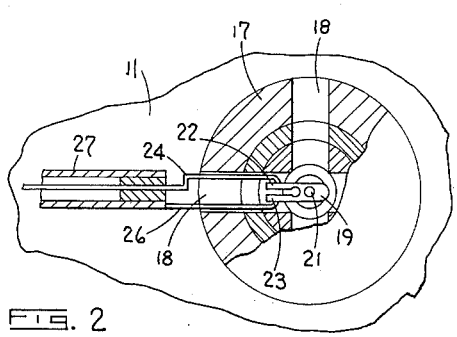
FIGURE 2 is a sectional view taken along the line II—II of FIGURE 1.

In the apparatus shown in FIGURE 3, most of the parts are the same as those shown and described in connection with FIGURES 1 and 2, and all of the parts which are the same bear the same reference numbers as utilized in connection with FIGURES 1 and 2 and no further description of such identically numbered parts will be necessary. However, in this case the plate 19 is supported upon a bracket 41 which in turn is supported on a rod 42, said rod substantially taking the place of the tube 27 in the structure shown in FIGURES 1 and 2. Said rod 42 extends centrally through the sleeve 28 and terminates in a knob 43. The O-ring 30 functions, as before, to prevent the entry of external atmosphere into the evacuated space within the casing 10.

Thus, by manipulation of the knob 43, the diaphragm 19 may be moved radially with respect to the casing 10 and may be rotated around the longitudinal axis of the rod 42.

A heating coil 44 of any suitable type is mounted on wires 46 and 47 which wires are mounted in a suitable fixture 48 by which they are supported on and extend through the casing 10. Said wires 46 and 47 are energized by any suitable source.

To heat the diaphragm 19, the knob 43 is manipulated first to pull the diaphragm 19 radially outwardly from its operating position shown in FIGURE 3 into the recess 49, rotated into alignment with the projected axis of the coil 44 and then moved radially inwardly so that said diaphragm 19 is located within said coil 44 in the manner shown in broken lines in FIGURE 3. If potential has not been previously applied to the conductors 46 and 47 for the purpose of heating said coil 44, said potential may now be applied whereby the diaphragm 19 is heated as before and the contaminating materials suitably vaporized.

While inserting the diaphragm 19 into the space within the coil 44 has the obvious advantage of uniform heating of the entirety of the diaphragm 19, and will be recognized that some of the benefits of the invention may be obtained by merely locating the diaphragm 19 adjacent said coil and, under such circumstances, said coil may be replaced by any convenient form of heating element adjacent to which said diaphragm may be located for heating purposes.

While a particular preferred embodiment of the invention has been described hereinabove, it will be apparent that modifications and changes may be made therein and, therefore, the invention contemplates such changes or modifications as are included within the scope of the appended claims.

What is claimed is:
1. In an electron optical instrument having an evacuated casing and a supporting structure having an aperture for passing an electron beam, the improvement in the structure having said aperture, which improvement comprises a thin sheet of material having a small opening therethrough through which the electron beam may pass, said material having a high melting point; and means for heating said sheet while same is in said casing to vaporize contaminating materials on said sheet.

2. In an electron microscope including an evacuated casing having an electron beam source, an objective lens and a projection lens and an objective aperture located for limiting the size of the electron beam passing from said objective lens to said projection lens located therein, the improvement in the structure providing said objective aperture which improvement comprises a thin sheet of material having a small opening therethrough through which the electron beam may pass, said material being electrically conductive and having a high melting point; and means for heating said sheet while same is in said casing to vaporize contaminating materials on said sheet.

3. An electron optical instrument comprising an evacuated casing having an electron beam source and an objective lens, said lens having pole pieces arranged therein; a thin sheet of molybdenum located within said casing between the pole pieces of said objective lens coaxial with said lenses and said source, said sheet having a small opening therethrough for limiting the size of the electron beam passing through said objective lens; means for moving said molybdenum sheet within said casing from between said pole pieces to one side of said axis while maintaining said sheet within said casing; and electrical leads connected to said sheet and connectible to a potential source for heating said sheet to evaporate contaminating materials therefrom.

4. An electron microscope according to claim 3, wherein said sheet is substantially U-shaped and one electrical lead is connected to one leg of said U-shaped sheet and another electrical lead is connected to the other leg thereof.

5. In an electron microscope including an evacuated casing having an electron beam source and an objective lens having an objective aperture located for limiting the size of the electron beam passing through said objective lens, the improvement in the structure providing said objective aperture, which improvement comprises: an element having a small opening therethrough through which the electron beam may pass, said element being electrically conductive and having a high melting point; and means for heating said element while same is in said casing to vaporize contaminating materials on said element.

References Cited in the file of this patent
UNITED STATES PATENTS

| 2,271,990 | Ramberg | Feb. 3, 1942 |
| 2,417,213 | Picard | Mar. 11, 1947 |
| 2,467,224 | Picard | Apr. 12, 1949 |
| 2,467,225 | Hillier | Apr. 12, 1949 |
| 2,799,779 | Weissenberg | July 16, 1957 |

FOREIGN PATENTS

| 646,440 | Great Britain | Nov. 22, 1950 |

OTHER REFERENCES

Radio Receiving and Television Tubes by Mayer and Wostrel, McGraw-Hill, 1936.